United States Patent [19]
Fox et al.

[11] Patent Number: 5,953,333
[45] Date of Patent: *Sep. 14, 1999

[54] METHOD AND SYSTEM FOR OVERHEAD CONTROLLED SWITCHING

[75] Inventors: David L. Fox, Allen; David D. Wilson, Plano, both of Tex.

[73] Assignee: Alcatel USA Sourcing, L.P., Plano, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/673,003

[22] Filed: Jul. 1, 1996

[51] Int. Cl.⁶ .................................................. H04Q 11/00
[52] U.S. Cl. ........................................... 370/360; 370/387
[58] Field of Search .................... 370/216, 217, 370/218, 219, 220, 225, 226, 227, 228, 241, 242, 244, 247, 250, 251, 352, 355, 357, 359, 360, 419, 535, 907, 386, 387, 388, 351; 340/825, 825.01, 826, 827, 825.06, 825.07, 825.16

[56] References Cited

U.S. PATENT DOCUMENTS

| | | | |
|---|---|---|---|
| 5,276,425 | 1/1994 | Swanson et al. | 340/826 |
| 5,315,594 | 5/1994 | Noser | 370/353 |
| 5,386,418 | 1/1995 | Komuro et al. | 370/356 |
| 5,436,890 | 7/1995 | Read et al. | 370/352 |
| 5,473,642 | 12/1995 | Osawa et al. | 375/377 |
| 5,663,949 | 9/1997 | Ishibashi et al. | 370/220 |

FOREIGN PATENT DOCUMENTS

| | | | |
|---|---|---|---|
| 0683466 | 11/1995 | European Pat. Off. | G06F 17/60 |
| 9002372 | 3/1990 | WIPO | G16F 11/10 |

OTHER PUBLICATIONS

"A Study of Non–Blocking Switching Networks," by Charles Cos, *Bell System Technical Journal*, Mar. 1953, pp. 406–423.

PCT Search Report, dated Nov. 6, 1997.

*Primary Examiner*—Chi H. Pham
*Assistant Examiner*—Kwang B. Yao
*Attorney, Agent, or Firm*—Baker & Botts, L.L.P.

[57] ABSTRACT

A system (10) for transmitting data is presented. The system (10) includes a data transmission medium (12, 28) and an overhead generator (40) connected to the data transmission medium (12, 28), such as through a switch. The overhead generator (40) digitally encodes control data into one or more bytes in a data transmission frame (70) used to transmit data over the system (10). The system also includes a monitor/selector (22) coupled to the data transmission medium (12, 28). The monitor/selector (22) reads the digitally encoded control data in the byte in the data transmission frame (70). A processor (24) coupled to the monitor/selector (22) processes the digitally encoded control data in the data transmission frame (70).

29 Claims, 3 Drawing Sheets

METHOD AND SYSTEM FOR OVERHEAD CONTROLLED SWITCHING

TECHNICAL FIELD OF THE INVENTION

This invention relates in general to the field of data transmission, and more particularly to a system and method of overhead controlled switching.

BACKGROUND OF THE INVENTION

Telecommunications systems are used to transmit digital and analog data between two telecommunications system interfaces. Data transmission may be accomplished using a solid transmission path, such as a copper conductor or fiber optic conductor, or by using electromagnetic radiation, such as a cellular phone. Regardless of the method used to transmit data, data transmission from a first telecommunications interface to a second telecommunications interface typically requires some form of processing by a switching system.

A digital cross connect system is a specialized switching system that provides improved flexibility in switching services. An example of a modern digital cross connect system is provided by U.S. Pat. No. 5,436,890 to Read et al., entitled "Integrated Multi-Rate Cross Connect System," a assigned to DSC Communications Corporation, issued Jul. 25, 1995 (hereinafter "Read"). Such digital cross connect systems may include a plurality of devices that define the M input ports and N output ports of an M×N connection matrix switch that is operable to connect any of the M input ports to any of the N output ports.

Digital cross connect systems typically also include an administration subsystem that provides synchronization, monitoring, and control of the connection matrix. In addition, the digital cross connect system taught in Read contains redundant parallel planes of all matrix components, such that the digital cross connect system can experience a number of failures in both planes without loss of network traffic.

Despite the additional flexibility inherent in digital cross connect systems, such systems typically comprise a large number of discrete components. The operation of these components must be coordinated by a central administration unit. This administration unit must communicate with each of the discrete components that comprise the digital cross connect system. Because of the large number of digital cross connect system components and the control commands that must be transmitted to each component, the number of commands and the command transmission time can be significant factors affecting the operating efficiency of digital cross connect systems.

A similar problem may be encountered with any other system that utilizes parallel or redundant systems to improve system reliability, such as aircraft control systems, spacecraft instrumentation and controls, nuclear power plant control systems, and numerous other systems. In many systems that comprise a centralized controller with distributed components, the number of control commands and command transmission time can be significant factors affecting the operating efficiency of the system.

SUMMARY OF THE INVENTION

Therefore, a need has arisen for a system and method of overhead controlled switching. More specifically, a system and method for overhead controlled switching is needed that allows control commands to be transmitted radially to one class of components and then to be transmitted circumferentially to other classes of discrete components at the same administration level, to decrease the number of control commands and increase the command transmission time.

One aspect of the present invention is a system for transmitting data. The system includes a data transmission medium and an overhead generator connected to the data transmission medium, such as through a switch. The overhead generator digitally encodes control data into one or more bytes in a data transmission frame used to transmit data over the data transmission system. The system also includes a monitor/selector connected to the data transmission system. The monitor/selector reads the digitally encoded control data in the one or more bytes in the data transmission frame. A processor connected to the monitor/selector processes the digitally encoded control data in the data transmission frame.

One important technical advantage of the present invention is the ability to transmit data between control system components at similar hierarchical levels relative to the central control unit. By utilizing circumferential paths between such discrete components, the total number of messages required to be transmitted by the central administration unit can be significantly decreased.

Another important technical advantage of the present invention is that the processing speed of the administration unit may be significantly improved due to the corresponding decrease in the number of commands that must be formulated and transmitted by the administration unit. This increase in processing speed results in an increase in the net transmission speed of commands between the time data is received by the administration unit and the time commands are transmitted to the distributed components.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, and in which.

DETAILED DESCRIPTION OF THE INVENTION

Figure 1:
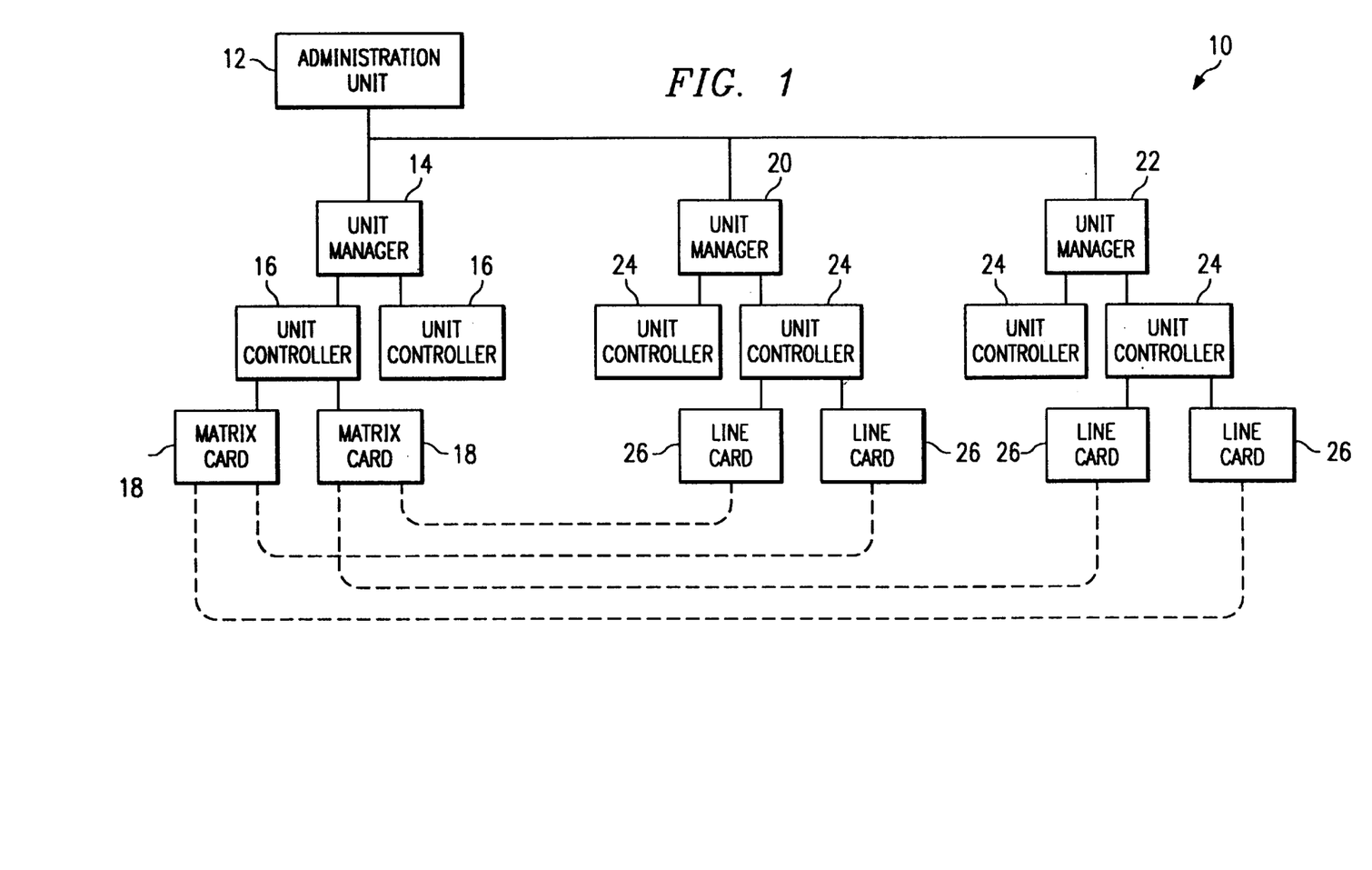
FIG. 1 shows an exemplary hierarchical control system architecture for a digital cross connect system.

FIG. 1 is an exemplary hierarchical control system architecture for a digital cross connect system. Hierarchical control architecture 10 includes an administration unit 12. Administration unit 12 is a data transmission system component that receives routing data for incoming data transmission signals, and determines the proper connections to be made within the digital cross connect system to route the incoming data signal to the required destination. Administration unit 12 communicates with a matrix unit manager 14. One or more matrix unit managers 14 may couple to administration unit 12.

Matrix unit manager 14 is a data transmission system component that receives commands from administration unit 12, processes the commands, and routes the commands to appropriate matrix unit controllers 16. As shown in FIG. 1, more than one matrix unit controllers 16 may couple to matrix unit manager 14. Matrix unit controllers 16 are data transmission system components that receive digitally-encoded data from matrix unit manager 14, process the data, and transmit the data to matrix cards 18. As shown in FIG. 1, more than one matrix card 18 may couple to matrix unit controller 16.

Administration unit 12 is also coupled to line unit managers 20 and 22. Line unit managers 20 and 22 are data transmission system components that receive digitally-encoded data from administration unit 12, process the data, and transmit the data to line unit controllers 24. Line unit controllers 24 are data transmission system components that receive digitally-encoded data from line unit managers 20 and 22, process the data, and route the data to the appropriate line cards 26.

Line cards 26 are data transmission system components that transmit data to and receive data from an external data communications media. Line cards 26 couple to an external communications media (not explicitly shown), and to a matrix interface 56, as shown by the dashed lines in FIG. 1.

In operation, administration unit 12 receives call routing information and digitally-encoded data from external sources (not explicitly shown). Administration unit 12 processes these call routing instructions and determines the appropriate matrix connections to accomplish the requested call routing. Administration unit 12 then transmits the appropriate matrix switching commands to matrix cards 18 via matrix unit managers 14 and matrix unit controllers 16.

Although administration unit 12 is operable to transmit switching instructions to line cards 26 via line unit manager 20 and 22 and line unit controller 24, the present invention utilizes the path shown by the dashed lines in FIG. 1, shown connecting matrix cards 18 with line cards 26. These dashed lines represent digitally-encoded data which is contained in the data stream that is being transmitted through the switching matrix. The present invention avoids the step of transmitting data from administration unit 12 to line cards 26 by encoding the control commands received at matrix cards 18 into unused segments in the digitally-encoded data stream that is transmitted between line cards 26 through matrix cards 18.

For example, the data transmitted between line cards 26 through matrix cards 18 may be in a synchronous optical network (SONET) format, which has 27 bytes of data reserved for control commands for every 810 bytes of data transmitted.

Figure 2:
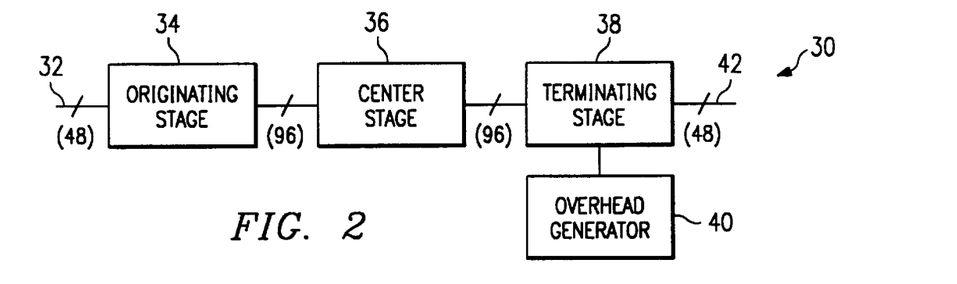
FIG. 2 shows an exemplary schematic diagram of a digital cross connect switching matrix.

FIG. 2 is a schematic diagram of a digital cross connect switching matrix 30. Digital cross connect switching matrix 30 includes incoming data channels 32, which are a data transmission medium that is coupled to matrix originating stage 34. Matrix originating stage 34 is coupled to matrix center stage 36. Matrix center stage 36 is coupled to matrix terminating stage 38. Matrix terminating stage 38 is coupled to an overhead generator 40 and outgoing data channels 42. Outgoing data channels 42 are a data transmission medium.

Matrix originating stage 34 comprises multiple data transmission system components, but may also comprise a single data transmission system component. As shown, there are 48 incoming data channels 32 which couple to matrix originating stage 34. Matrix originating stage 34 duplicates the number of incoming data channels 32, such that a total of 96 data channels form a data transmission medium that is coupled to matrix originating stage 34 and matrix center stage 36.

Matrix center stage 36 comprises multiple data transmission system components, but may also comprise a single data transmission system component. Matrix center stage 36 has twice as many input and output ports as do matrix originating stage 34 and matrix terminating stage 38, in order to make digital cross connect switching matrix 30 non-blocking. Matrix center stage 36 also includes 96 outgoing data channels which form a data transmission medium that is coupled to matrix terminating stage 38.

Matrix terminating stage 38 comprises multiple data transmission system components, but may also comprise a single data transmission system component. Matrix terminating stage 38 is coupled to overhead generator 40 and outgoing data channels 42. Based upon control commands received from administration unit 12 of FIG. 1, matrix center stage 36 connects the appropriate input from an output channel of matrix originating stage 34 to the appropriate output to an input channel of matrix terminating stage 38. The 96 channels between matrix center stage 36 and matrix terminating stage 38 are reduced to the 48 outgoing data channels 42 of matrix terminating stage 38.

Overhead generator 40 is a data transmission system component that monitors the data on any of the 48 outgoing data channels 42 from matrix terminating stage 38 and adds digitally-encoded data at appropriate unused segments in the data stream. For example, for data structures having a predefined format, overhead generator 40 locates predetermined unused segments within the data stream and splices or superimposes additional digitally-encoded data into those data locations. Overhead generator 40 has data processing capability, and is operable to process commands received from a first data transmission system component and to convert the commands into different commands for a second data transmission system component. Overhead generator 40 may include one or more computer programs, and that control or enable the actions of overhead generator 40.

In operation, the 48 incoming data channels 32 to matrix originating stage 34 are duplicated, such that 96 channels form a data transmission medium that is coupled to matrix originating stage 34 and matrix center stage 36. Likewise, 96 data channels form a data transmission medium that is coupled to matrix center stage 36 and matrix terminating stage 38. Matrix terminating stage 38 is coupled to the 48 outgoing data channels 42. This configuration is required to allow digital cross connect switching matrix 30 to be non-blocking.

When connections are changed within digital cross connect switching matrix 30, administration unit 12 of FIG. 1 transmits commands to the data transmission system components that comprise matrix originating stage 34, matrix center stage 36, matrix terminating stage 38, and overhead generator 40. These commands are processed by the various data transmission system components to which they are addressed. Furthermore, overhead generator 40 converts the commands into commands for line card 26 of FIG. 1 as appropriate, and encodes the commands into unused segments of the data stream being switched by digital cross connect system 10.

One skilled in the art will recognize that many different combinations of incoming and outgoing data channels may be used without departing from the scope or spirit of the present invention. For example, matrix originating stage 34 may have from a single incoming data channel to several thousand or more incoming data channels. Likewise, the incoming and outgoing data channels from other components may be different from those discussed herein as examples.

Figure 3:
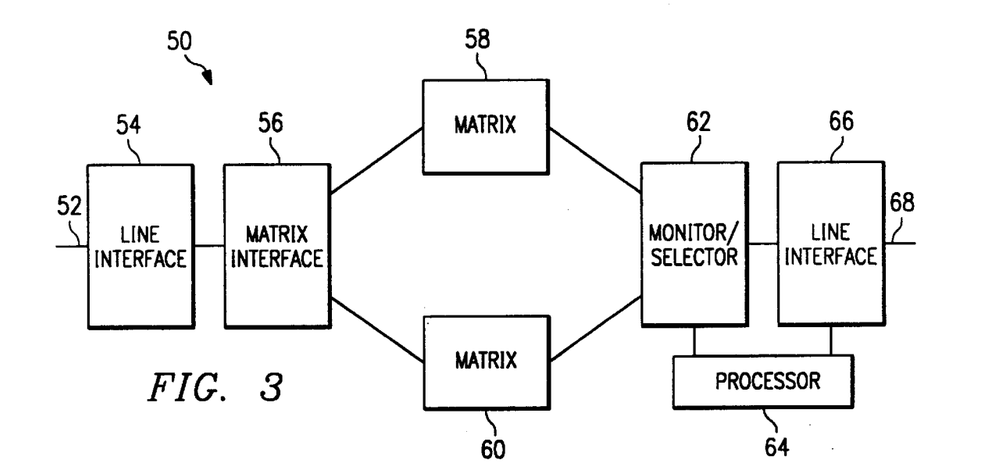
FIG. 3 shows an exemplary schematic diagram of a digital cross connect system.

FIG. 3 shows an exemplary schematic diagram of a digital cross connect system 50. Data transmission channel 52 enters digital cross connect system 50 and is coupled to a line interface 54. Line interface 54 is coupled to a matrix interface 56, which splits the signal received on data transmission channel 52 into two identical signals. Matrix interface 56 is coupled to a primary matrix 58 and a secondary matrix 60, and transmits the split signal from data transmission channel 52 to primary matrix 58 and secondary matrix 60.

Primary matrix 58 and secondary matrix 60 couple to monitor/selector 62. Monitor/selector 62 is coupled to processor 64 and line interface 66. Line interface 66 is coupled to data transmission channel 68. Digital cross connect system 50 forms a data transmission medium that is operable to carry an encoded data stream from data transmission channel 52 to data transmission channel 68.

Data transmission channel 52 is a data transmission medium that may include a copper conductor, a coaxial conductor, a fiber optic conductor, or other suitable data transmission media. Data transmission channel 52 may be characterized by a data transmission bandwidth ranging from several hundred hertz to greater than one gigahertz. Data transmission channel 52 may carry digital or analog data, but is hereafter described in particular as related to the transmission of digitally-encoded data.

Line interface 54 is a data transmission system component which is coupled to data transmission channel 52. Line interface 54 also is coupled to matrix interface 56. Line interface 54 may be many suitable data transmission channel interfaces, and may be capable of coupling to a large number of data transmission channels 52. Line interface 54 receives digitally-encoded data from data transmission channel 52 and transmits the digitally-encoded data to matrix interface 56. Line interface 54 may perform additional functions, such as noise filtering, switching, or surge overvoltage protection.

Matrix interface 56 is a data transmission system component that is coupled to line interface 54, primary matrix 58 and secondary matrix 60. Matrix interface 56 receives digitally-encoded data from line interface 54 and duplicates the digitally-encoded data for transmission to primary matrix 58 and secondary matrix 60. Many suitable methods may be used to duplicate the digitally-encoded data received from line interface 54 by matrix interface 56. For example, matrix interface 56 may include a pair of signal buffers with a 1:1 amplification ratio with an input that is directly coupled to line interface 54, and where the output of the first buffer is coupled to primary matrix 58 and the output of the second buffer is coupled to secondary matrix 60.

Primary matrix 58 and secondary matrix 60 are switching matrices having M inputs and N outputs, and are separately comprised of the matrix components shown in FIG. 2. Thus, primary matrix 58 and secondary matrix 60 each have a matrix originating stage 34, a matrix center stage 36, a matrix terminating stage 38, and an overhead generator 40. Primary matrix 58 and secondary matrix 60 are operable to connect any one of the M inputs to any one of the N outputs, and are described in further detail in reference to FIG. 2. Primary matrix 58 and secondary matrix 60 couple with matrix interface 56 and monitor/selector 62. Primary matrix 58 and secondary matrix 60 are data transmission system components that may comprise additional data transmission system components, as shown in FIG. 2.

Monitor/selector 62 is a data transmission system component that is coupled to primary matrix 58, secondary matrix 60, processor 64, and line interface 66. Monitor/selector 62 monitors the data quality of data signals received from primary matrix 58 and secondary matrix 60, and transmits the signal having the highest quality to line interface 66. Monitor/selector 62 may accomplish this function in conjunction with commands received from processor 64.

For example, monitor/selector 62 may monitor overhead bytes in a data transmission frame that include fault indicators. If the present data transmission path is through primary matrix 58, and an overhead byte in the data transmission frame indicates that a fault has occurred in a component of primary matrix 58, monitor/selector 62 may then switch the data transmission path to secondary matrix 60. Although the data transmission path is switched to the backup matrix, the backup matrix transmits the data from matrix interface 56 to monitor/selector 62 even when it is not included in the data transmission path. Monitor/selector 62 may include a default transmission path such as primary matrix 58, that is to be used when there is no detectable difference in signal quality between the two matrices.

Processor 64 is a data processing device that may comprise a personal computer, a microcomputer, or other suitable data processing equipment. Processor 64 monitors digitally-encoded data received at monitor/selector 62 and issues control commands to monitor/selector 62 and line interface 66. Processor 64 may include one or more computer programs that are coordinated with computer programs operating on overhead generator 40 of FIG. 2, and that control or enable the actions of processor 64. Processor 64 is a data transmission system component.

Line interface 66 is a data transmission system component that is coupled to processor 64, monitor/selector 62, and data transmission channel 68. Line interface 66 is similar to line interface 54. Line interface 66 receives control commands from processor 64 and is operable to connect data transmission channel 68 to and disconnect data transmission channel 68 from monitor/selector 62.

Data transmission channel 68 is a data transmission medium that may comprise a copper conductor, a coaxial conductor, a fiber optic conductor, or other suitable data transmission media. Data transmission channel 68 may be characterized by a data transmission bandwidth ranging from several hundred hertz to greater than one gigahertz. Data transmission channel 68 may carry digital or analog data, but is hereafter described in regards to the transmission of digitally-encoded data.

In operation, switching circuit 50 receives a signal over data transmission channel 52 via line interface 54 and matrix interface 56. Matrix interface 56 duplicates the signal and transmits it to primary matrix 58 and secondary matrix 60. Primary matrix 58 and secondary matrix 60 have M signal inputs and N signal outputs, and are operable to connect any of the M inputs to any of the N outputs. Primary matrix 58 and secondary matrix 60 receive signals from an administration unit (not explicitly shown), and form a connection between the appropriate M inputs and N outputs.

For example, primary matrix 58 and secondary matrix 60 may have 48 inputs and 48 outputs. The digitally-encoded data signal entering digital cross connect system 50 over data transmission channel 52 may couple to primary matrix 58 input number 16 via line interface 66 and matrix interface 56. This data signal may also couple to input 26 of secondary matrix 60, but may alternately couple to any of the 48 inputs of secondary matrix 60, including but not limited to input number 16.

Control signals received from administration unit 12 of FIG. 1 by primary matrix 58 and secondary matrix 60 determine which of the M inputs are connected to which of the N outputs of the matrices. For example, input 26 of primary matrix 58 may be connected to output 43 of primary matrix 58. Likewise, input 26 of secondary matrix 60 may also couple to output 43 of secondary matrix 60. Alternately, secondary matrix 60 may establish the switched connection using any other combination of inputs and outputs, such as input 4 and output 21.

The switched data signal is then transmitted to monitor/selector 62. Monitor/selector 62 compares the output of primary matrix 58 which corresponds to the output of secondary matrix 60, and transmits the data signal having the highest quality to line interface 66. For example, if output number 12 of primary matrix 58 is carrying the same data as output number 41 of secondary matrix 60, monitor/selector 62 will monitor and select either output number 12 of primary matrix 58 or output number 41 of secondary matrix 60 to be coupled to the appropriate data transmission channel 68.

Processor 64 may assist monitor/selector 62 in comparing the two signals and determining the signal with the highest quality. As previously noted, if both signals are of comparable quality, a default connection may be chosen, such as from primary matrix 58.

Software operating on processor 64 may be designed to control some operations of monitor/selector 62 and line interface 66. For example, based upon the data quality of the signals received from primary matrix 58 and secondary matrix 60, processor 64 may switch line interface 66 such that line interface 66 connects and transmits the signal from either primary matrix 58 or secondary matrix 60 to data transmission channel 68.

The present invention includes a software system operating on processor 64 that is operable to receive commands encoded into the digital data stream by overhead generator 40 of primary matrix 58 and secondary matrix 60 from administration unit 12 of FIG. 1. In a system which does not embody the present invention, a separate connection must be made from administration unit 12 to line interface 66 to convey the commands.

In addition, the present invention transmits encoded commands via the digital data stream that is being transmitted by the redundant switching matrix. For example, the digital data stream from primary matrix 58 may be chosen by monitor/selector 62 as a default data transmission path. The present invention utilizes the digital data stream carried by secondary matrix 60 to transmit the encoded control commands to monitor/selector 62.

Thus, to form a connection from data transmission channel 52 to data transmission channel 68, administration unit 12 of FIG. 1 transmits control commands to primary matrix 58 and secondary matrix 60 of FIG. 3. One of the switching matrices, such as primary matrix 58, is selected to make the connection between data transmission channel 52 and data transmission channel 68, either by default or for signal quality. Overhead generator 40 of the backup switching matrix, which is secondary matrix 60 in the present invention, encodes control commands into the data stream for line interface 66. These control commands are received and processed by monitor/selector 62 and processor 64, and processor 64 transmits the control commands to line interface 66 to cause line interface 66, which is initially disconnected, to connect data transmission channel 68 to the appropriate channel of monitor/selector 62.

Likewise, to disconnect data transmission channel 52 from data transmission channel 68, administration unit 12 of FIG. 1 transmits control commands to primary matrix 58 and secondary matrix 60. Overhead generator 40 of the matrix carrying the back-up signal encodes control commands into the data stream that are received by monitor/selector 62 and processor 64. These commands are then transmitted from processor 64 to line interface 66, which disconnects data transmission channel 68 from monitor/selector 62.

Figure 4:
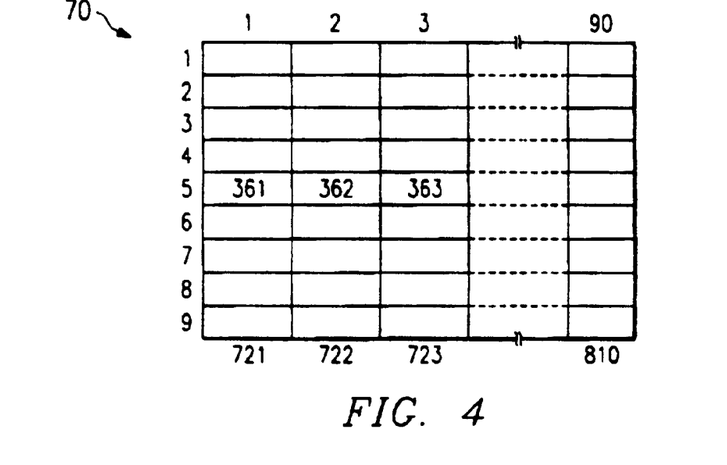
FIG. 4 shows a SONET data transmission frame embodying concepts of the present invention.

FIG. 4 is a SONET data transmission frame 70. A data transmission frame is a data transmission format that may include control data (also called "transmission overhead") and message data (also called "payload"). SONET data transmission frame 70 is a data format for digitally-encoded data that may be transmitted through digital cross connect switching matrix 30. SONET data transmission frame 70 includes 810 bytes of data arranged as 90 columns having 9 bytes per column. The first three columns in each row of data are overhead. The remaining bytes 4–90 in column 1 are payload data transmitted through digital cross connect switching matrix 30 from data transmission channel 52 to data transmission channel 68 of FIG. 3. Byte number 91 is the first byte in row 2, column 1. This numbering convention continues as shown until row 9 is reached, such that the first byte in column 1 of row 9 is byte number 721, and the last byte in row 9 is byte 810.

TABLE 1

| BYTE 1 | BYTE 2 | BYTE 3 |
|---|---|---|
| A1/A1 | A2/A2 | C1/IOL-COM |
| BYTE 91 | BYTE 92 | BYTE 93 |
| B1/B1 | E1/IOL-COM | F1/OHT1 |
| BYTE 181 | BYTE 182 | BYTE 183 |
| D1/OHT2 | D2/OHT3 | D3/OHT4 |
| BYTE 271 | BYTE 272 | BYTE 273 |
| H1/H1 | H2/H2 | H3/H3 |
| BYTE 361 | BYTE 362 | BYTE 363 |
| B2/EC-B1P | K1/CNTL | K2/BCID |
| BYTE 451 | BYTE 452 | BYTE 453 |
| D4/OHT5 | D5/OHT6 | D6/OHT7 |
| BYTE 541 | BYTE 542 | BYTE 543 |
| D7/OHT8 | D8/OHT9 | D9/OHT10 |
| BYTE 631 | BYTE 632 | BYTE 633 |
| D10/OHT11 | D11/OHT12 | D12/OHT13 |
| BYTE 721 | BYTE 722 | BYTE 723 |
| Z1/OHT14 | Z2/OHT15 | E2/OHT16 |

Table 1 shows the SONET transmission overhead with identifying labels and byte numbers. The relationship of the SONET overhead to the entire SONET data transmission frame 70 is shown in FIG. 4. The present invention utilizes the switching matrix that is not being used to carry additional control commands. For example, if primary matrix 58 of FIG. 3 is selected to carry the telecommunications data through digital cross connect system 50, then the data in secondary matrix 60 may be modified to carry control data without any decrease in transmission capacity, fault protection, or other services provided by digital cross connect system 10.

As shown in FIG. 4, overhead bytes 361, 362, and 363 in the SONET data overhead are used to transmit switching information from matrix card 18 to line interface 66. Overhead generator 40 in FIG. 2 is coupled to matrix terminating stage 38 and matrix card 18 and modifies the digitally-encoded data in bytes 361, 362, and 363 of SONET data transmission frame 70 in accordance with switching commands received from administration unit 12 via matrix unit manager 14 and matrix unit controller 16.

In operation, digitally-encoded data is transmitted over incoming data channel 32 of FIG. 2 through matrix originating stage 34, matrix center stage 36, and matrix terminating stage 38. As previously stated, administration unit 12 transmits switching commands to matrix card 18 of matrix terminating stage 38 via matrix unit manager 14 and matrix unit controller 16. These commands are transmitted from matrix terminating stage 38 to overhead generator 40, which processes the commands and modifies the data in bytes 361, 362, and 363 of SONET data transmission frame 70 shown in FIG. 4. This data is then received at monitor/selector 62, and is processed by processor 64.

Processor 64 detects the information in bytes 361, 362, and 363, determines the appropriate commands for line card 26, and transmits those commands to line card 26 by encoding the commands into the data being transmitted through digital cross connect system 10. For example, if data transmission from data transmission channel 52 to data transmission channel 68 of FIG. 3 is to be terminated, administration unit 12 of FIG. 1 may transmit controls to matrix card 18 via matrix unit manager 14 and matrix unit controller 16 to re-align the switching matrix. Matrix unit manager 14, matrix unit controller 16 and matrix card 18 are contained within primary matrix 58 and secondary matrix 60 of FIG. 3.

After these commands are received, overhead generator 40 of FIG. 2 of the backup matrix determines the appropriate commands for line interfaces 66, and modifies bytes 361, 362, and 363 of SONET data transmission frame 70 to encode these commands. This data is then transmitted from the backup matrix to monitor/selector 62. Monitor/selector 62 in conjunction with processor 64 receives the data in bytes 361, 362, and 363 of SONET data transmission frame 70, and processor 64 issues commands to line card 26 to complete the connection between data transmission channel 52 and data transmission channel 68 via primary matrix 58 or secondary matrix 60.

Likewise, a similar process may be used to disconnect the data transmission path formed from data transmission channel 52 to data transmission channel 68 through primary matrix 58 and secondary matrix 60 of FIG. 3. Administration unit 12 of FIG. 1 transmits appropriate commands to matrix card 18 of FIG. 1 and matrix originating stage 34, matrix center stage 36, and matrix terminating stage 38 of FIG. 2. These commands are processed by overhead generator 40 of the backup matrix, which modifies bytes 361, 362, and 363 of SONET data transmission frame 70. Monitor/selector 62 and processor 64 receive this modified data in bytes 361, 362, and 363 of SONET data transmission frame 70 and processor 64 issues appropriate control commands to line card 26 to disconnect the data transmission path formed from data transmission channel 52 to data transmission channel 68 through primary matrix 58 or secondary matrix 60.

Figure 5A:
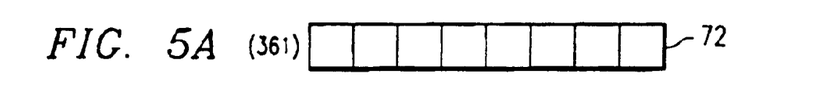
FIGS. 5A through 5C show bit maps for bytes 361, 362, and 363 of a SONET data transmission frame.
Figure 5B:
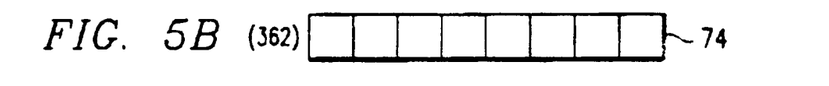
Figure 5C:
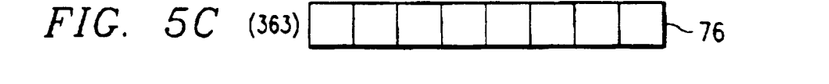

FIGS. 5A through 5C show the eight-bit bytes for bytes 361, 362, and 363 of SONET data transmission frame 70 of FIG. 4. All eight bits of bytes 72, 74, and 76 may be used to transmit control data between overhead generator 40 and line interface 66. Alternately, only a portion of the bits may be utilized in each frame. For example, the first bit of byte 72, 74, or 76 may be a "frame phase" bit, such that the value of the frame phase bit is "0" if the first 7 bits of data are being transferred, and the value of frame phase bit is "1" if the last 7 bits of data are being transferred. In this manner, commands that require more than 8 bits of data can be transmitted over two successive frames.

Alternately, additional bits may be used to transmit commands that require more than 8 bits of data in a single frame. For example, bytes 74 and 76 could be combined to transmit a total of 16 bits of data in a single frame.

Figure 6:
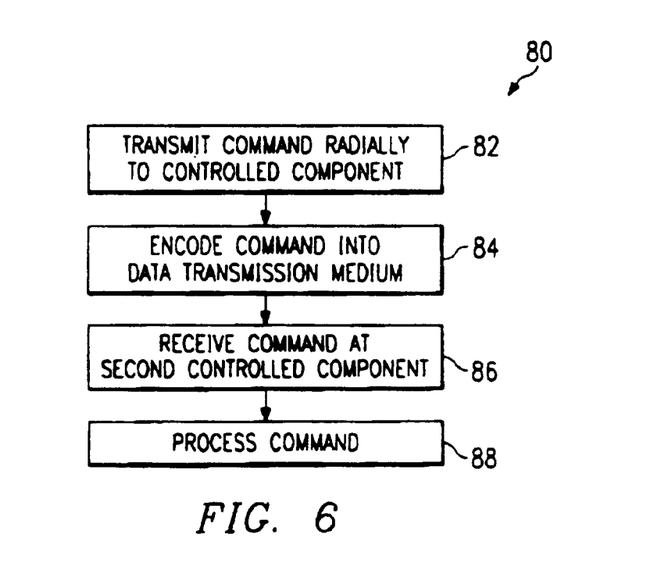
FIG. 6 shows a flow chart of a method for controlling a system in accordance with the present invention.

FIG. 6 is a flow chart 80 of a method for controlling a system in accordance with the present invention. At step 82, a control command is radially transmitted from a controller, such as administration unit 12 of FIG. 1, to a controlled component, such as matrix card 18 of FIG. 1. At step 84, the command is converted into a form suitable for use by a second controlled component, such as line card 26, and is then encoded into a data transmission medium.

At step 86, the command is received at the second controlled component. For example, monitor/selector 62 and processor 64 of FIG. 3 may retrieve the encoded command from the data transmission medium, and may then transmit the command to line interface 66. The command is then processed at step 88, such as by connecting monitor/selector 62 to data transmission channel 68.

Although the present invention has been described in detail, it should be understood that various changes, substitutions, and alterations can be made hereto without departing from the spirit and scope of the invention as determined by the appended claims.

What is claimed is:

1. A system for transmitting data comprising:

a data transmission medium;

a primary switching matrix coupled to the data transmission medium, the primary switching matrix operable to digitally encode traffic data into a data transmission frame format;

a secondary switching matrix coupled to the data transmission medium, the secondary switching matrix operable to digitally encode traffic data into a data transmission frame format, the primary and secondary switching matrices operable to digitally encode control data into at least one byte of the data transmission frame format;

a monitor/selector coupled to the data transmission medium, the monitor/selector operable to read the digitally encoded control data of the data transmission frame format from a selected one of the primary and the secondary switching matrices, the monitor/selector operable to receive the digitally encoded traffic data from a selected one of the primary and secondary switching matrices not selected for reading the control data; and a processor coupled to the monitor/selector, the processor operable to process the digitally encoded control data.

2. The system of claim 1, wherein the data transmission medium comprises two or more data transmission channels wherein the primary switching matrix is operable to connect one of the two or more data transmission channels to any of the other two or more data transmission channels.

3. The system of claim 2, wherein the secondary switching matrix is operable to connect one of the two or more data transmission channels to any of the other two or more data transmission channels.

4. The system of claim 3 further comprising:

a matrix interface coupled to the data transmission medium and the primary switching matrix, and the data transmission medium and the secondary switching matrix, the matrix interface operable to receive a data transmission stream and to transmit the data transmission stream to the primary switching matrix and the secondary switching matrix; and wherein the monitor/selector is operable to monitor and select one of the data transmission stream from the primary switching matrix and the data transmission stream from the secondary switching matrix for transmission to the data transmission medium.

5. The system of claim 4 further comprising a line interface coupled to the processor, the monitor/selector, and the data transmission medium, wherein the line interface is operable to connect and disconnect the data transmission medium from the monitor/selector according to commands received from the processor in response to the digitally encoded control data.

6. The system of claim 5 further comprising:

wherein the primary switching matrix further comprises an initiating stage, a center stage, a first overhead generator, and a terminating stage;

wherein the secondary switching matrix further comprises an initiating stage, a center stage, a second overhead generator, and a terminating stage;

wherein the first overhead generator is coupled to the primary switching matrix terminating stage; and wherein the second overhead generator is coupled to the secondary switching matrix terminating stage.

7. The system of claim 1 wherein the data transmission frame format is a synchronous optical network data transmission frame.

8. The system of claim 7 wherein the digitally-encoded control data is encoded in byte numbers 361, 362, and 363 of the synchronous optical network data transmission frame.

9. The system of claim 1 further comprising a line interface coupled to the processor, the monitor/selector, and the data transmission medium, wherein the line interface is operable to connect and disconnect the data transmission medium from the monitor/selector according to commands received from the processor in response to the digitally encoded control data.

10. A system for transmitting data comprising:

a data transmission medium comprising two or more data transmission channels;

a primary switching matrix coupled to the data transmission medium, the primary switching matrix operable to connect one of the two or more data transmission channels to any of the other two or more data transmission channels;

a secondary switching matrix coupled to the data transmission medium, the secondary switching matrix operable to connect one of the two or more data transmission channels to any of the other two or more data transmission channels;

wherein the primary and secondary switching matrices are operable to digitally encode traffic data into a data transmission frame format;

wherein the primary and secondary switching matrices are operable to digitally encode control data into the data transmission frame format;

a monitor/selector coupled to the data transmission medium, the primary switching matrix, and the secondary switching matrix, the monitor/selector operable to read the digitally encoded control data from a selected one of the primary and the secondary switching matrices in the data transmission frame format, the monitor/selector operable to receive the traffic data from a selected one of the primary and the secondary switching matrices not selected for reading the control data; and a processor coupled to the monitor/selector, the processor operable to process the digitally encoded control data.

11. The system of claim 10 further comprising:

a matrix interface coupled to the data transmission medium and the primary switching matrix, and the data transmission medium and the secondary switching matrix, the matrix interface operable to receive a data transmission stream from the data transmission medium and to transmit the data transmission stream to the primary switching matrix and the secondary switching matrix; and wherein the monitor/selector is operable to monitor and select one of the data transmission stream from the primary switching matrix and the data transmission stream from the secondary switching matrix for transmission to the data transmission medium.

12. The system of claim 11 further comprising a line interface coupled to the processor, the monitor/selector, and the data transmission medium, wherein the line interface is operable to connect and disconnect the data transmission medium from the monitor/selector according to commands received from the processor in response to the digitally encoded control data.

13. The system of claim 12 further comprising:

wherein the primary switching matrix further comprises an initiating stage, a center stage, a first overhead generator, and a terminating stage;

wherein the secondary switching matrix further comprises an initiating stage, a center stage, a second overhead generator, and a terminating stage;

wherein the first overhead generator is coupled to the primary switching matrix terminating stage; and wherein the second overhead generator is coupled to the secondary switching matrix terminating stage.

14. The system of claim 10 wherein the data transmission frame format is a synchronous optical network data transmission frame.

15. The system of claim 14 wherein the digitally-encoded control data is encoded in byte numbers 361, 362, and 363 of the synchronous optical network data transmission frame.

16. The system of claim 10 further comprising a line interface coupled to the processor, the monitor/selector, and the data transmission medium, wherein the line interface is operable to connect and disconnect the data transmission medium from the monitor/selector according to commands received from the processor in response to the digitally encoded control data.

17. A system for transmitting data comprising:

a data transmission medium carrying an encoded data stream with unused segments;

a first data transmission system component coupled to the data transmission medium;

a second data transmission system component coupled to the data transmission medium;

a third data transmission system component coupled to the data transmission medium;

an administration unit coupled to the first data transmission system component, the administration unit operable to transmit control commands to the first and third data transmission system components;

wherein the second data transmission system component is operable to select one of the first and third transmission system components in order to receive data, the second transmission system component operable to select one of the first and third transmission components not selected for data reception in order to receive the control commands; and wherein the first data transmission system component is operable to transmit the encoded data stream to the second data transmission system component via the data transmission medium when selected by the second data transmission system component for data reception, wherein the third data transmission system component is operable to transmit the control commands to the second data transmission system component via the data transmission medium by encoding the control commands into unused segments of the encoded data stream when selected by the second data transmission system component for command reception.

18. The system of claim 17 further comprising:

wherein the encoded data stream is a synchronous optical network transmission frame; and wherein the unused segments of the encoded data stream are bytes 361, 362, and 363 of the synchronous optical network transmission frame.

19. The system of claim 17 wherein the first data transmission system component is a switching matrix.

20. The system of claim 17 wherein the second data transmission system component is a monitor/selector.

21. The system of claim 17 wherein the administration unit is coupled to the first data transmission system component via at least one intervening component.

22. The system of claim 17 further comprising:

a matrix interface coupled between the data transmission medium and the first data transmission system component, and the data transmission system and the third data transmission system component, the matrix interface operable to receive the encoded data stream and to transmit the encoded data stream to the first data transmission system component and the third data transmission system component.

23. The system of claim 22 further comprising:

wherein the first data transmission system component is a primary switching matrix;

wherein the third data transmission system component is a secondary switching matrix; and wherein the second data transmission system component is a monitor/selector, the monitor/selector is operable to monitor and select the encoded data stream received from one of the first data transmission component and the third data transmission component.

24. A method for controlling a system comprising the steps of:

providing a data stream and a control command from a first component;

providing a data stream and a control command from a second component;

encoding the control command in an unused segment of the data stream transmitted over a data transmission medium;

providing the control command to a third component from a selected one of the first and second components;

providing the data stream to the third component from a selected one of the first and second components not selected to provide the control command; and executing the control command with a control system.

25. The method of claim 24 wherein the step of providing the control command comprises providing a control command through a hierarchical control structure to the third component.

26. The method of claim 24 wherein the step of providing the control command comprises providing a control command through a secondary switching matrix.

27. The method of claim 24 wherein the step of encoding comprises encoding the control command in bytes 361, 362, and 363 of a synchronous optical network transmission frame.

28. The method of claim 24 wherein the step of providing the control command comprises providing the control command to a monitor/selector.

29. The method of claim 24 wherein the step of executing further comprises the steps of:

transmitting the control commands to a processor;

executing the control commands on the processor; and changing the state of the first component and the second component in response to the control commands.

* * * * *